(12) United States Patent
Wilkerson

(10) Patent No.: US 11,453,328 B2
(45) Date of Patent: Sep. 27, 2022

(54) LOAD SECURING SYSTEM FOR FLAT-BED VEHICLES SUCH AS A TRUCK

(71) Applicant: Robin Kelly Wilkerson, Odessa, TX (US)

(72) Inventor: Robin Kelly Wilkerson, Odessa, TX (US)

( * ) Notice: Subject to any disclaimer, the term of this patent is extended or adjusted under 35 U.S.C. 154(b) by 260 days.

(21) Appl. No.: 17/002,842

(22) Filed: Aug. 26, 2020

(65) Prior Publication Data
US 2020/0384908 A1    Dec. 10, 2020

(51) Int. Cl.
*B60P 7/15*    (2006.01)
*B60P 7/08*    (2006.01)

(52) U.S. Cl.
CPC .................. *B60P 7/0892* (2013.01)

(58) Field of Classification Search
CPC ........... B60P 7/15; B65D 85/62; B65D 85/20; B66C 1/16
USPC ................. 410/143, 36, 40, 42, 47
See application file for complete search history.

(56) References Cited

U.S. PATENT DOCUMENTS

| | | | | |
|---|---|---|---|---|
| 4,595,161 A * | 6/1986 | Williams | .............. | F28F 9/0136 248/68.1 |
| 7,080,864 B2 * | 7/2006 | Casteran | ................... | B66C 1/16 294/67.4 |
| 8,807,612 B2 * | 8/2014 | Hagelskjaer | ........... | B65D 85/62 294/67.4 |
| 2012/0093608 A1 * | 4/2012 | Kovacs, Jr. | ........... | F16L 3/2235 410/47 |

* cited by examiner

*Primary Examiner* — D Glenn Dayoan
*Assistant Examiner* — Sunsurraye Westbrook

(57) ABSTRACT

The present invention discloses a load securing system for flat-deck vehicles. The system includes a first member configured to provide a stable resting surface to load mounted over a flat-deck of the vehicle. The system further includes a second member having an elongated flat body, and two lugs fixedly configured underside in proximity to its two ends and extending downward. The second member is configured to act as a divider to separate rows of loads mounted over the flat-deck of the vehicle. The system further includes a third member having an elongated body embodying a track system, and a pair of slidable members each slidably configured over the track system of the elongated body and slide in opposing direction. The third member acts as a divider to separate rows of loads mounted over the flat-deck of the vehicle and retain the load mounted between the pair of slidable members.

8 Claims, 7 Drawing Sheets

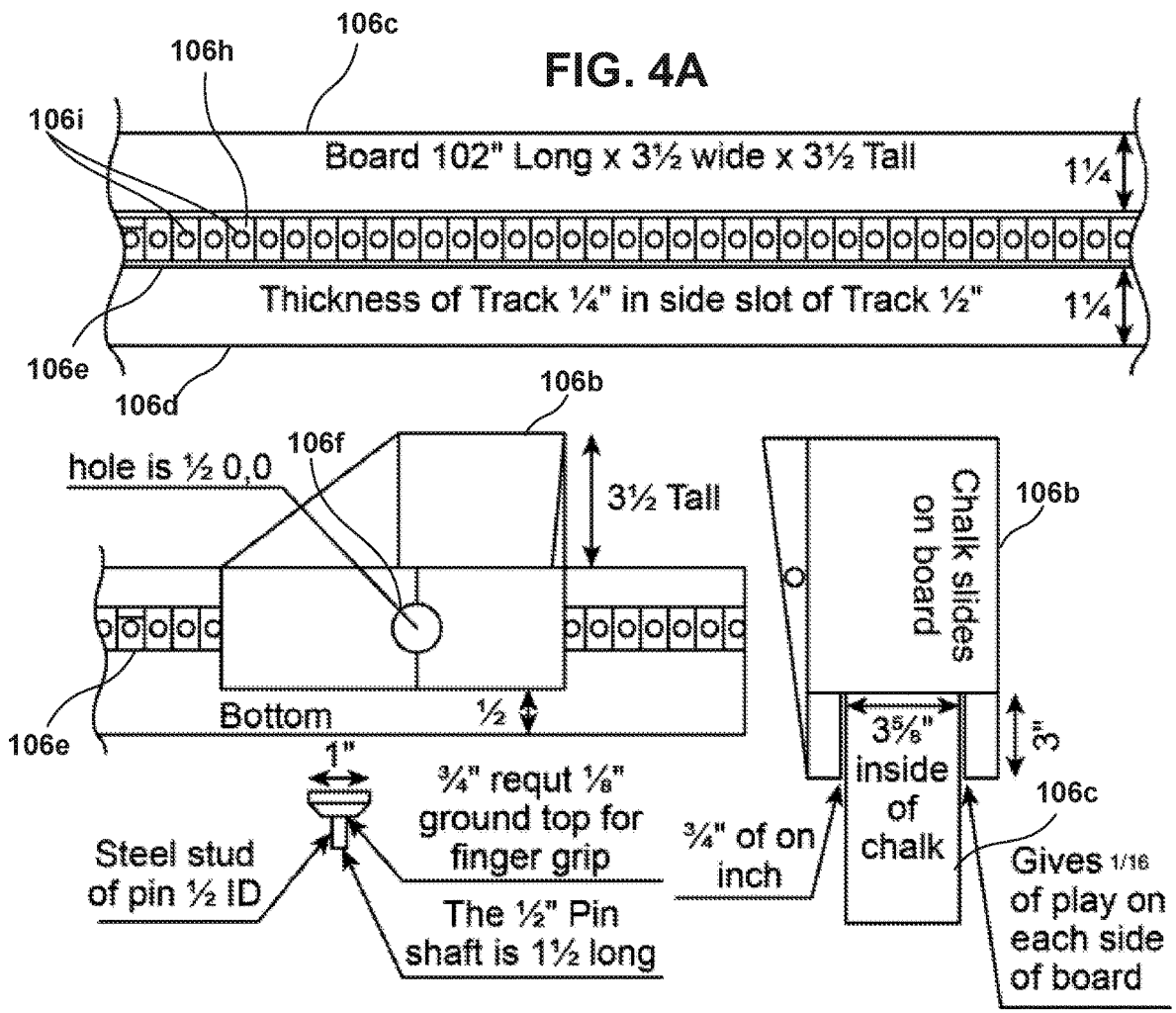

LOAD SECURING SYSTEM FOR FLAT-BED VEHICLES SUCH AS A TRUCK

FIELD OF THE INVENTION

The present application generally relates to the field of load securing means and more specifically relates to a load securing system for flat-deck vehicles such as a truck.

BACKGROUND

Different types of loads are transported via tractors or trucks or similar vehicles from one location to another location. These vehicles especially large highway trucks have integrated flat decks/beds for transporting the loads. Some of these trucks may be coupled to a separate trailer having a flat deck/bed for carrying the loads. Uneven loads can make the vehicle or trailer unstable. Loads should be secured, or arranged so that they do not slide around while the vehicle is moving. Usually, loads such as lumber are stacked over the deck and secured in place using chains and webbing with tensioning devices (tensioners) or using dunnages. Dunnages are pieces of wood tied down to the decks of the vehicles and used to secure the loads from shifting during transportation. While use of tensioners (webbing hand ratchets, chain based tensioners etc) may cause severe head, face and shoulder injuries to workers when used incorrectly, use of dunnages may prove to be expensive due to their shorter life span as dunnages lack weather resistance. In other words, weather can cause dunnages to crack, warp or split and thus make them extremely unsafe for uses over the time.

Several attempts have been made in the past to address above-mentioned problems, such as those found in U.S. Pat. No. 5,693,163 to Gregory A. Hoover et al. U.S. Pat. No. 3,414,140 to John G Feldkamp. Not only this, U.S. Pat. Pub. No. 20190255986 by inventor discloses a simple load securing system providing a stable resting surface to the loads placed over the deck of the truck. The load securing system as disclosed in the application includes a bottom-side, a top-side, a right-side, a left-side, a first-end, and a second-end. The patent application further discloses about load securing system being structured and arranged to be coupled to decking surface of the truck using fasteners. Although this solution provide a firm support or stability for the loads (such as lumber) placed over the decks of the trucks. Such solution may still be inadequate if the lumber (or the like loads) is stacked over the deck of the truck.

In light of the above-mentioned background, there is a need for a technical and more reliable solution in the form of a load securing system that can be used with the trucks for securing the load stacked over the truck's deck and that would promisingly address the issues discussed above.

SUMMARY

Accordingly, the inventor herein proposes an improvised load securing system that would not only increase cost-effectiveness for truckers but also provide safety while the loads are stacked over the deck of the truck.

It is another objective of the present invention to provide an environmental friendly solution that may eliminate or lower uses of wooden dunnages used in the industry.

It is another objective of the present invention to provide a modular load securing system that can be quickly assembled and disassembled to secure the stacked load over the deck of the truck.

Another objective of the present invention is to provide a solution to the truckers that may make the loading and unloading of loads (such as lumber) over the deck of the truck less dangerous. Usually, loading or unloading of the loads from the vehicles and working at height leads to injuries. The proposed load securing system organizes and secures the loads in a more secured manner, giving very less room for the loads to slide out during transportation thereby avoiding any risk of any accidents.

Embodiments of the present invention disclose a load securing system for flat-deck vehicles such as trucks. The system includes a first member configured to provide a stable resting surface to load mounted over a flat-deck of the vehicle. The system further includes a second member having an elongated flat body, and two lugs, each fixedly configured underside in proximity to two ends of the elongated flat body and extending upward. The second member is configured to act as a divider to separate rows of loads mounted over the flat-deck of the vehicle. The system further includes a third member having an elongated body embodying a track system, and a pair of slidable members each slidably configured over the track system of the elongated body and slide in opposing direction. The third member acts as a divider to separate rows of loads mounted over the flat-deck of the vehicle and retain the load mounted between the pair of slidable members.

These and other features and advantages of the present invention will become apparent from the detailed description below, in light of the accompanying drawings.

BRIEF DESCRIPTION OF ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

FIGS. 4A-4C shows various partial sectional views of the third member of the load securing system of FIG. 3A;

DETAILED DESCRIPTION

Figure 1A:
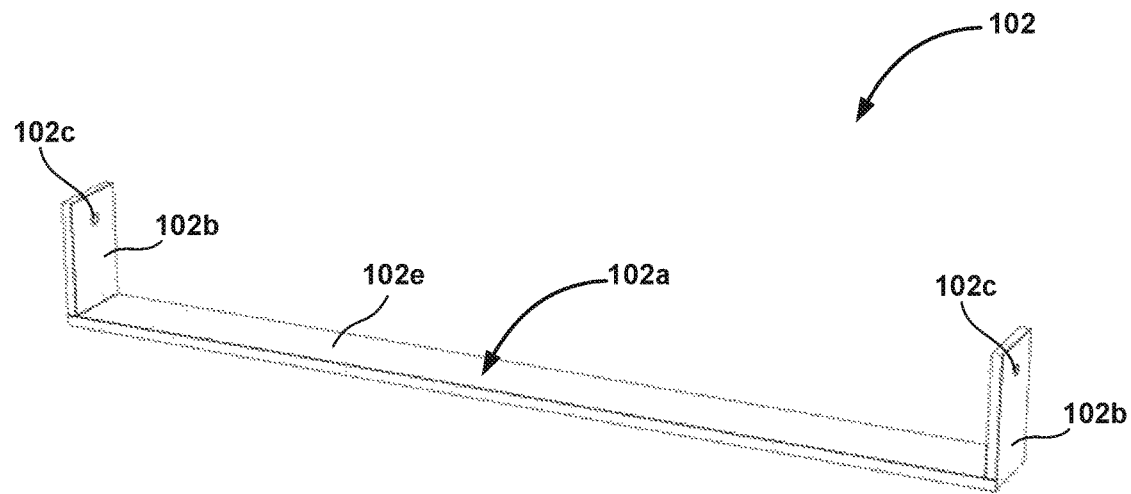
FIG. 1A shows a bottom perspective view of a first member of a load securing system, according to an embodiment of the present invention.

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a load securing system. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems, apparatuses, and methods have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope. Decking surface as disclosed herein refers to a flat bed or deck of a trailer, truck or the like. Decking surface is able to accept use of three of load securing member(s) to secure the load.

The load securing system of the present invention will now be described with reference to the accompanying drawings, which should be regarded as merely illustrative without restricting the scope and ambit of the present invention. Embodiments of the present invention will now be described with reference to FIGS. 1-6.

Figure 1B:
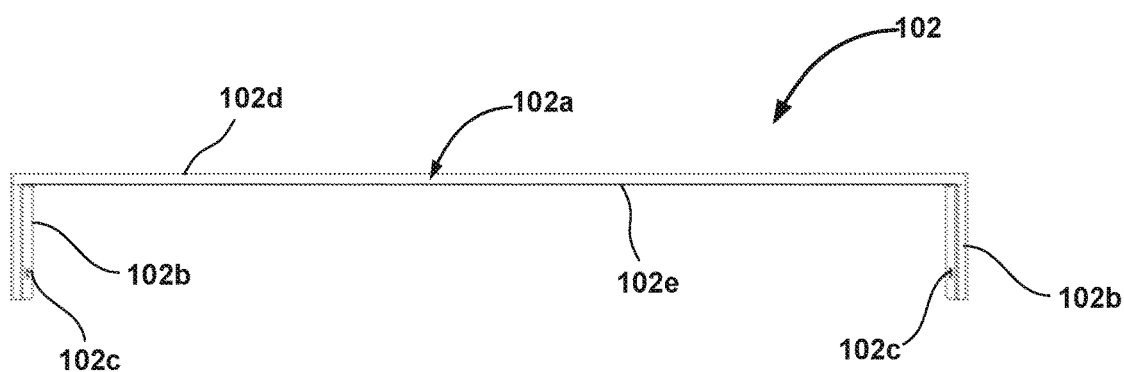
FIG. 1B shows a front view of the first member of the load securing system of FIG. 1A.
Figure 5A:
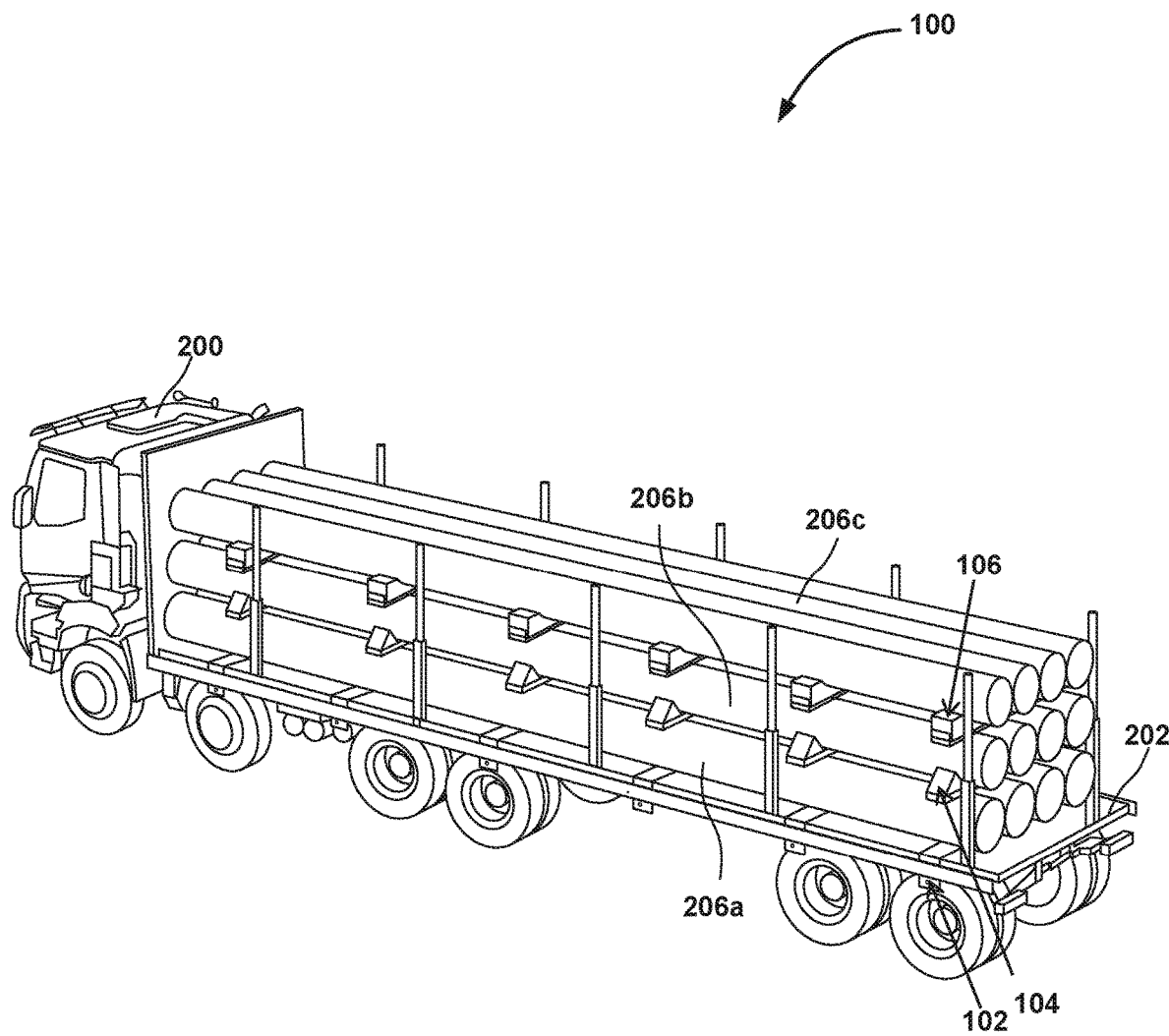
FIGS. 5A-5B shows a flat-deck vehicle such as a truck with load (Eg. lumber) stacked in rows over the flat-deck and the load securing system of the present invention in use.
Figure 5B:
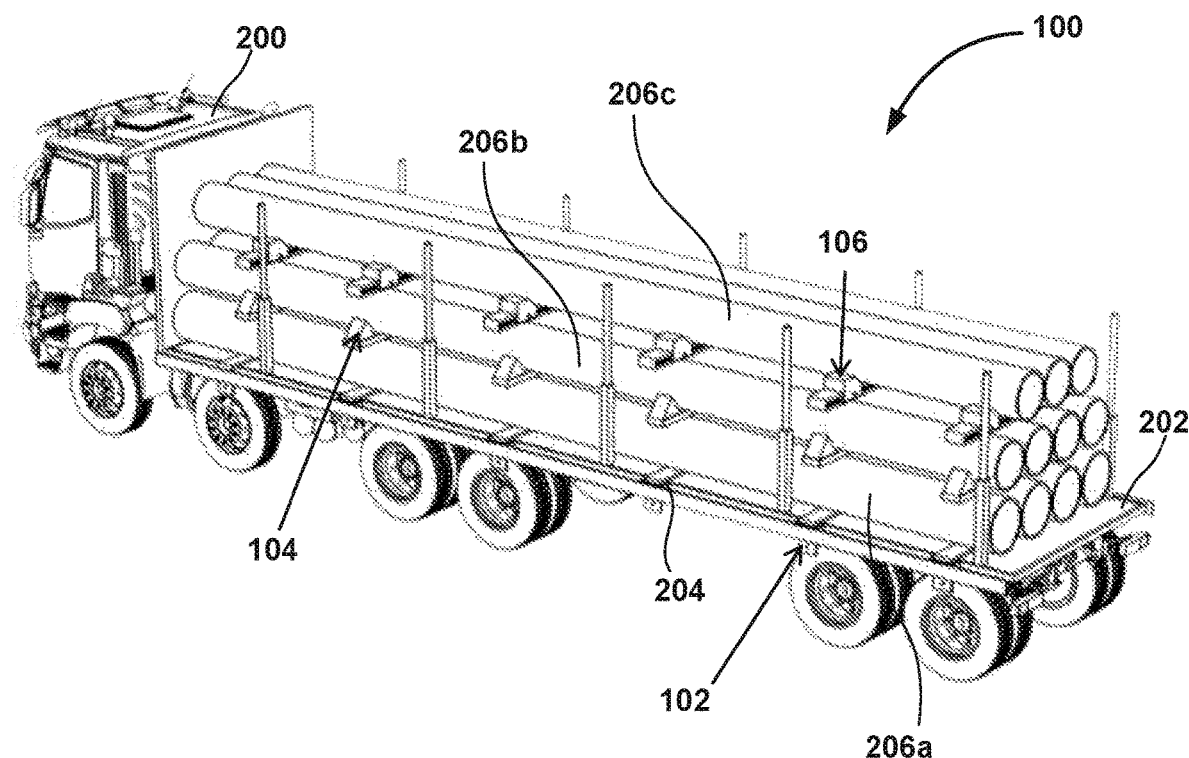
Figure 6:
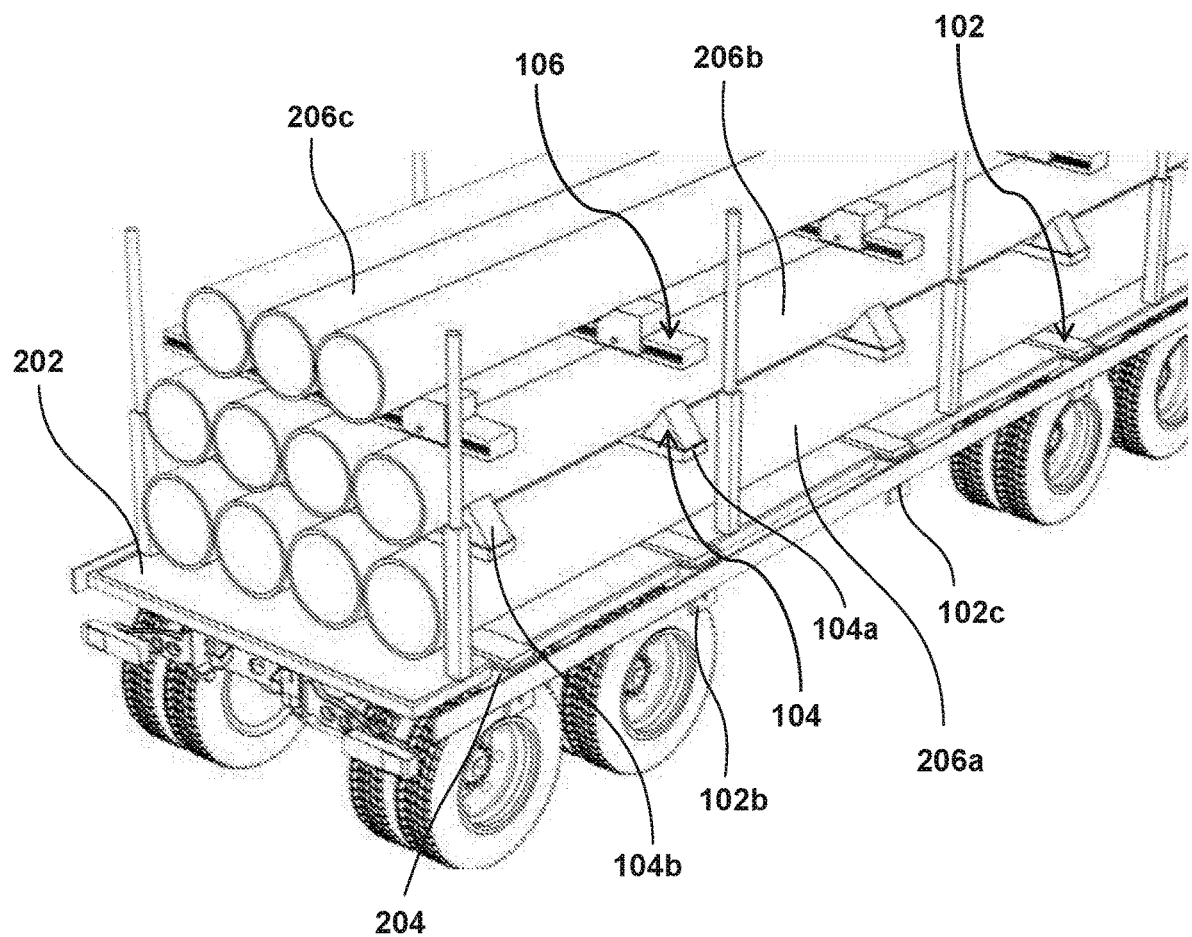
FIG. 6 shows partial view of the flat-deck vehicle of FIG. 5A with the load stacked in rows over the flat-deck.

Referring to FIGS. 1A-1B, there is shown a first member 102 of a load securing system 100. The first member 102 comprises an elongated flat body 102a. The elongated flat body 102a is preferably rectangular in shape with a predefined length, breadth and thickness. The length of the elongated flat body 102a is preferably chosen similar to the width of the deck 202 of the truck 200. The elongated flat body 102a includes a top surface 102d, and a bottom surface 102e. The first member 102 further comprises two side arms 102b each fixedly configured underside at the bottom surface 102e at a first end and a second end of the elongated flat body 102a extending perpendicularly downward. The two side arms 102b include a width substantially similar to the width of the elongated flat body 102a. In some other embodiments, the width of the side arms 102b may be smaller or larger than the width of the elongated flat body 102a. Further, according to the embodiment, the length of each of the two arms 102b are chosen such as to enable the side arms 102b to get into and received within clamps 204 configured on sides of the flat-deck 202 of the vehicle 200 as seen in FIG. 6. Further, each of the two arms 102b comprises an aperture 102c. According to the embodiment, the aperture 102c is preferably located in proximity to a free end (end not attached to the elongated body 102a) of the side arm 102b. The aperture 102c is configured for receiving a fastener (such as screw or similar fastener) for removably mounting the member 102 over the flat-deck 202 of the vehicle 200. In other words, once the fasteners are received within the aperture 102c of the side arm, then member 202 is locked down over the vehicle's deck surface. Depending upon the length of the deck 202 of the vehicle (such as a truck 200), one can secure or mount multiple members 102 over the deck 202. In the example shown in FIGS. 5A-5B, it is seen that six members 102 are secured over the deck 202. These members 102 when configured over the truck's deck 202 provide a stable resting surface to load (such as lumber, pipes etc) mounted over the flat-deck 202 of the vehicle 200. As seen in FIG. 5A-5B, the six arranged members 102 over the deck 202 provide support surface to four lumbers. However, depending upon the width or dimensions of the load (lumber for example), more or less number of loads may be supported by the members 102 mounted over the deck 202 of the truck 200.

Figure 2A:
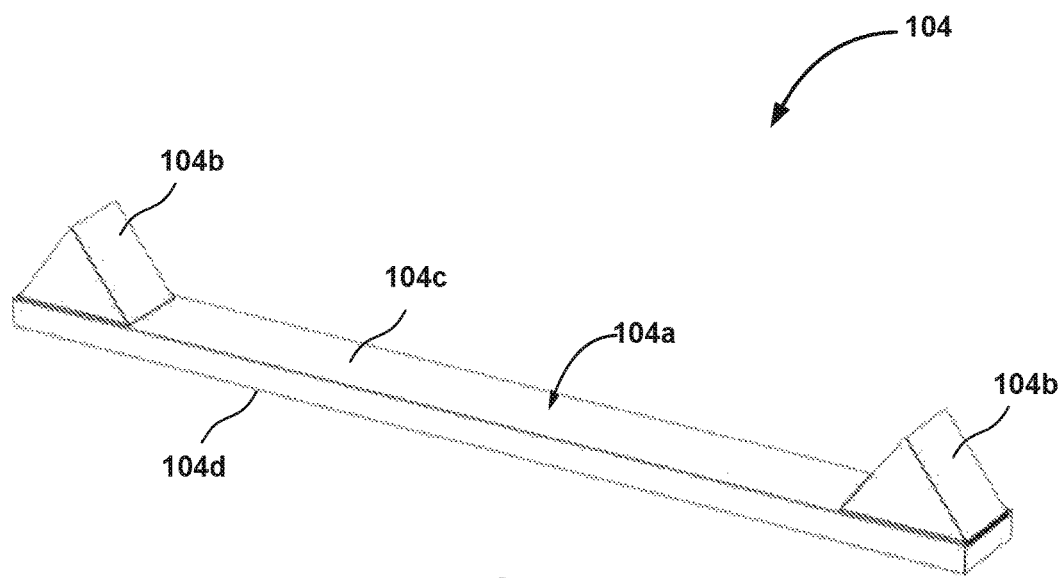
FIG. 2A shows a top perspective view of a second member of the load securing system, according to an embodiment of the present invention.
Figure 2B:
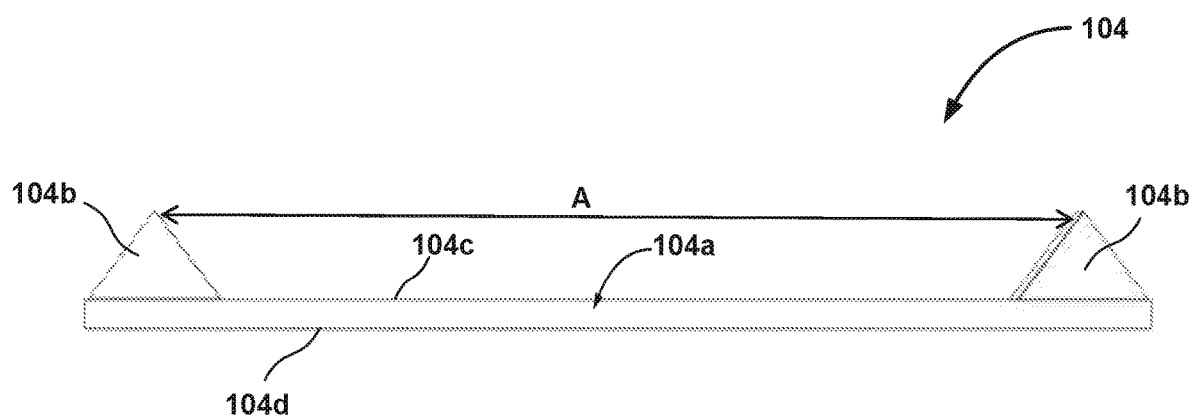
FIG. 2B shows a front view of the second member of the load securing system of FIG. 2A.
Figure 3A:
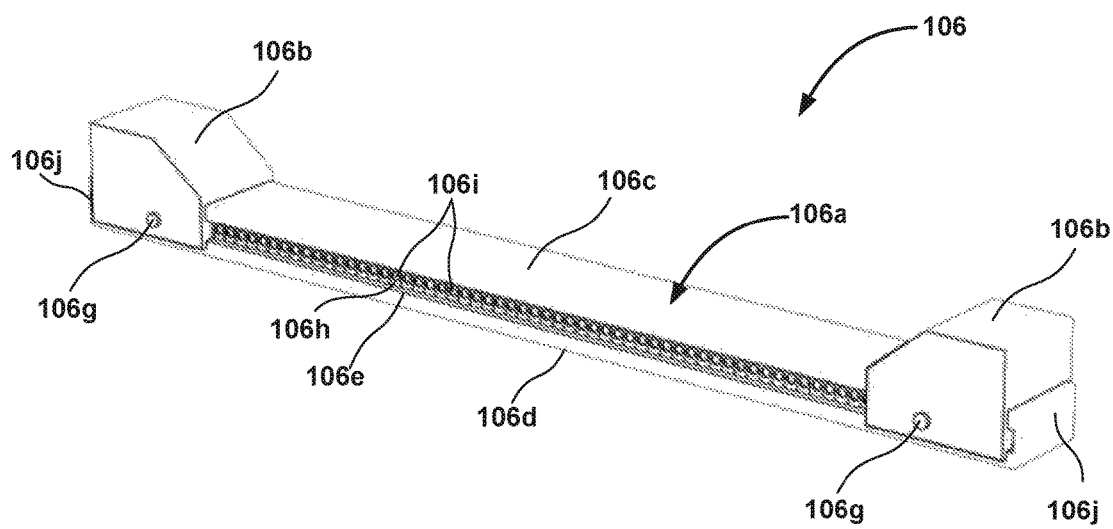
FIG. 3A shows a front perspective view of a third member of the load securing system, according to an embodiment of the present invention.
Figure 3B:
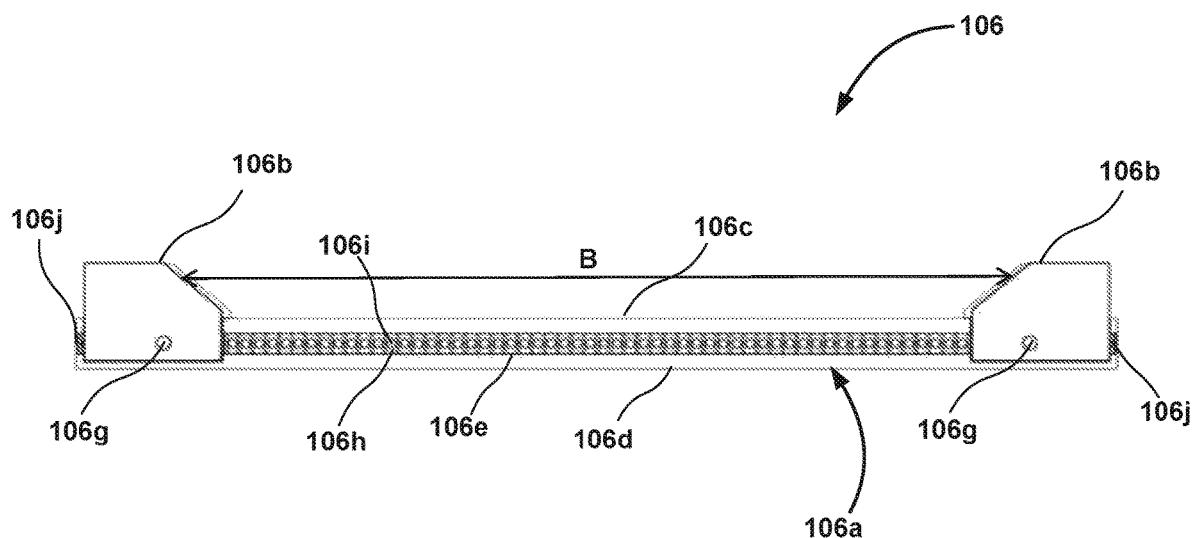
FIG. 3B shows a front view of a third member of the load securing system, according to an embodiment of the present invention.

Referring to FIGS. 2A-2B, there is shown a second member 104 of a load securing system 100. The second member 104 includes a second elongated flat body 104a with a top surface 104c, and a bottom surface 104d. The elongated flat body 104a is preferably rectangular in shape with a predefined length, breadth and thickness. The length of the elongated flat body 104a is preferably chosen similar to the width of the deck 202 of the truck 200. The second member 104 further includes two lugs 104b. Each of the two lugs 104b is fixedly configured at the top surface 104c in proximity to a proximal end and a distal end of the elongated flat body 104a extending upward. The lugs 104b may be configured in variety of shapes. However, according to the embodiment, the lugs 104b are preferably made triangular in shape. The lug 104b according to the embodiment is three sided equal in length. In some embodiment, the three sided lug 104b may have unequal side lengths. The second member 104 is configured to act as a divider to separate rows of loads mounted over the flat-deck 202 of the vehicle 200 as seen in FIGS. 5A-5B. Further, the two lugs 104b fixedly configured over the elongated flat body 104a of the member 104 functions to retain the load mounted therebetween and prevent sliding out of the load. The space from tip of one of the lug 104b to the tip of the other lug 104b (represented as "A" in FIG. 2B) is used to hold the load mounted over the top surface 104c. Multiple members 104 may be used while the load securing system 100 is in use, for example, as seen in FIGS. 5A-5B, the second members 104 may be either same in numbers as that of the first members 102 mounted over the flat deck 202 of the vehicle 200. In some other embodiment, lesser or more number of the second members 104 may be mounted atop of a first row of the load 206a to securely hold the load (such as lumber). Depending upon number of rows of the load stacked over the deck 202, one may use multiple layers of the second members 104 to divide or separate rows of load stacked over the first row 206a of the load. In the example shown in FIGS. 5A-5B, three rows of loads 206a-206c are seen stacked over the deck 202 of the vehicle 200, six second members 104 are seen holding a second row of load 206b stacked over the first row of load 206a supported by six first members 102.

Referring to FIGS. 3A-3B and 4A-4C, there is seen a third member 106 of a load securing system 100. Like the second member 104, the third member 106 acts as a divider to separate rows of loads mounted over the flat-deck of the vehicle 200. The third member 106 includes a third elongated body 106a having a top guide 106c, and a bottom guide 106d. The two guides are connected together at two sides 106j. The elongated flat body 106a is preferably rectangular in shape with a predefined length, and width. The length of the elongated flat body 106a is preferably chosen similar to the width of the deck 202 of the truck 200. The elongated body 106a further includes a track system 106e configured between the two guides 106c and 106d. As seen, the track system 106e is configured midway of the flat body 106a longitudinally extending from one end to the other end of the elongated flat body 106a. According to the embodiment, the track system 106e further includes a plurality of track segments 106h. Each of the track segments 106h include a slot or hole 106i.

According to the embodiment, the member 106 further includes a pair of slidable members 106b. The slidable members 106b may be made in various shapes, for example, rectangular or square etc. Each of the slidable members 106b slidably and functionally engages the track system 106e of the elongated body 106a. The slidable members 106b slide opposing each other (towards each other) over the track system 106e. The member 106 is adjustable in size. The size adjustability is achieved by sliding the slidable members 106b either towards each other or away from each other (towards to ends of the elongated body 106a). Once appropriate positions for the two slidable members 106b is chosen, the slidable members 106b are then locked in their position to form a retaining area (represented as "B" in FIG. 3B) to hold a row of load stacked thereon and over other rows of loads. The pair of slidable members 106b are locked at desired place/position over the track system 106e using a fastener 106g that engages the first slot 106f located at the slidable members 106b. The fastener preferably includes but not limited to screw or peg screw and so on. The fastener 106g engaging to the slot 106f further engages the slot 106i located at the track segments 106h of the track system 106e. In the example seen in FIGS. 5A-5B, multiple members 106 are seen in use along with other members 104,102 of the load securing system 100. Although in FIGS. 5A-5B, the number of members 106 (six in particular) are seen to be same as the members 102 and 104. It should be understood that more or less number of members 106 may be used for securing the load. In the specific example seen in FIG. 5A, the third member 106 is seen to retain four lumbers or pieces of load 206c. In another example seen in FIG. 5B, the third member 106 is seen to retain three lumbers or pieces of load 206c. But as discussed above, the member 106 is adjustable in nature by sliding slidable members 106b towards each other one can decrease the retaining space "B" and secure lesser or more number of lumbers or load in general. In the example, when same number of load/lumber are present stacked in the rows then one can just use the first member 102 and the second member 104 or all three members 102, 104 and 106. However, to accommodate variable number of load/lumber present stacked in the rows over the deck 202 of the vehicle 200, one can use the third member 106 to retain the load. For example, if the top most row 206c just contain three lumbers or load compared to four lumbers retained by the other two lower members 102, 104 then one should use the third member 106 together with the other two members 102, 104 to retain the decreased number load or lumber present in the top most row as seen in FIG. 5B.

According to the embodiment, the first member 102, the second member 104 and the third member 106 and parts thereof is made of plastic (or other suitable composite or other material) such that the load securing system is effectively weatherproof, and durable in use. The members 102,104,106 and associated parts and components of the members 102,104,106 may be made in various sizes based on design requirements which can be used to realize working of the invention. The first member 102, the second member 104, and the third member 106 are used to organize and securely hold the load stacked over the flat-deck of the vehicle 200 in rows. According to various embodiments, and based on arrangement or stacking of the load over the deck, the members 102,104, and 106 may be used in various combinations or just some of these may be used.

While various embodiments of the disclosure have been illustrated and described, it will be clear that the disclosure is not limited to these embodiments only. Further, the dimensions shown for the third member 106 in FIGS. 4A-4C are for example purpose for a preferred embodiment and these dimensions of the member 106, its parts/components thereof can change based on design requirement. Numerous modifications, changes, variations, substitutions, and equivalents will be apparent to those skilled in the art, without departing from the spirit and scope of the disclosure, as described in the claims.

Although particular embodiments of the invention have been described in detail for purposes of illustration, various modifications and enhancements may be made without departing from the spirit and scope of the invention. The scope of the invention is accordingly defined by the following claims.

I claim:

1. A load securing system (100) for flat-deck vehicles (200), comprising:

at least one first member (102) having a first elongated flat body (102a) with a top surface (102d), and a bottom surface (102e), and two arms (102b) each configured underside at the bottom surface (102e) at a first end and a second end of the elongated flat body (102a) and extending perpendicularly downward therefrom, wherein the at least one first member (102) is configured to provide a stable resting surface to load mounted over a flat-deck of the vehicle (200);

at least one second member (104) having a second elongated flat body (104a) with a top surface (104c), and a bottom surface (104d), and two lugs (104b), each fixedly configured at the top surface (104c) in proximity to a proximal end and a distal end of the elongated flat body (104a) and extending upward therefrom, wherein the at least one second member (104) is configured to act as a divider to separate rows of loads mounted over the flat-deck of the vehicle (200);

at least one third member (106) comprising a third elongated body (106a) having a top guide (106c), a bottom guide (106d), and a track system (106e) configured therebetween; and a pair of slidable members (106b) each slidably configured over the track system (106e) of the third elongated body (106a) and slide towards each other, wherein the at least one third member (106) acts as a divider to separate rows of loads mounted over the flat-deck of the vehicle (200) and retain the load mounted between the pair of slidable members (106b); and wherein, the at least one first member (102), the at least one second member (104), and the at least one third member (106) are used to organize and securely hold the load stacked over the flat-deck of the vehicle (200).

2. The load securing system (100) of claim 1, wherein each of the two arms (102b) are further configured to get into and received within clamps (204) configured on sides of the flat-bed (202) of the vehicle (200).

3. The load securing system (100) of claim 2, wherein each of the two arms (102b) further comprising an aperture (102c) configured for receiving a first fastener for removably mounting the first member (102) over the flat-deck of the vehicle (200).

4. The load securing system (100) of claim 1, wherein each of the lugs (104b) of the at least one second member (104) is triangular in shape and functions to retain the load mounted therebetween and prevents sliding out of the load retained therein.

5. The load securing system (100) of claim 1, wherein the pair of slidable members (106b) configured to slide over the track system (106e) comprises a first slot (106f).

6. The load securing system (100) of claim 1, wherein the track system (106e) comprises a plurality of track segments (106h), each having a second slot (106i).

7. The load securing system (100) of claim 5, wherein the pair of slidable members (106b) are locked in place over the track system (106e) by using a second fastener (106g) that engages the first slot (106f).

8. The load securing system (100) of claim 7, wherein the second fastener (106g) engaging to the first slot (106f) further engages to the second slot (106i) located in the track segments (106h).

* * * * *